Patented Oct. 17, 1939

2,176,413

UNITED STATES PATENT OFFICE 2,176,413

1.3-DIAZA-ANTHRAQUINONES

Fritz Baumann and Heinz Werner Schwechten, Leverkusen-I. G. Werk, Germany, assignors to General Aniline Works, Inc., New York, N. Y., a corporation of Delaware No Drawing. Application April 7, 1938, Serial No. 200,680. In Germany April 16, 1937

9 Claims. (Cl. 260—251)

The present invention relates to new valuable compounds. In accordance with our invention new products are obtained having a structure analogous to that of anthraquinone by subjecting a 6:7-benzo-quinazoline to the action of such oxidizing agents as are capable of converting anthracene into anthraquinone. The reaction proceeds as follows:

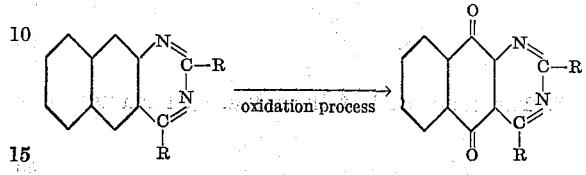

It is to be understood that R stands for the hydroxyl group, or aryl or for a radical of a compound which is capable of being vatted. The resulting product is a 1.3-diaza-anthraquinone.

We wish to point out that every oxidizing agent which is capable of oxidizing anthracene into anthraquinone can be employed for our present invention, chromic acid in an acid medium, in particular in the presence of glacial acetic or sulfuric acid, being preferred.

In the 6.7-benzo-quinazolines used as starting materials the benzene nucleus linked to the carbon atoms 6 and 7 may be substituted once or several times by a halogen. Valuable products are obtained by using as starting materials 6.7-benzo-quinazolines being substituted in 2- and 4-position one of them containing a hydroxyl group and the other containing an aryl or a radical of a compound which is capable of being vatted, preferably of an anthraquinone. Our new vattable products are, generally speaking, valuable intermediates for the production of dyestuffs as, for instance, of vat dyestuffs, acid wool dyestuffs, or pigment dyestuffs. They can be subjected to further reactions such as a halogenation or a sulfonation. Hydroxyl groups which may be present in 2- or 4-position can be exchanged by a halogen, for instance, by reacting thereupon with phosphorus-pentachloride. In the halides thus obtained the halogen atom is capable of being easily exchanged. Therefore these halides can be subjected to further transformation, for instance, with amines which contain at least 1 hydrogen attached to the nitrogen. Preferably amines of anthraquinone or other compounds which are capable of being vatted are employed. The following examples illustrate the invention without, however, restricting it thereto, the parts being by weight.

Example 1

A suspension of 10 parts of 2-hydroxy-4-phenyl-6.7-benzo-quinazoline in 200 parts of acetic acid is heated to 95–100° C., whereupon 11 parts of chromic acid, which are dissolved in 60 parts of acetic acid and 12 parts of water, are gradually added. The immediately occurring oxidation is soon finished. From the green solution thus formed there are separated egg yolk crystals which are filtered with suction at room temperature, rinsed with acetic acid and water and then dried. The oxidation product thus obtained represents the 1.3-diaza-2-hydroxy-4-phenylanthraquinone of the following constitution:

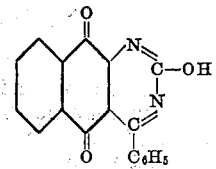

It can be recrystallized from nitrobenzene and has a melting point of 344° C.; it is soluble in sulfuric acid with a yellow coloration and yields a blue vat.

The 2-hydroxy-4-phenyl-6.7-benzoquinazoline can, for instance, be obtained by heating 2-amino-3-benzoyl-naphthalene with urethane in the presence of zinc-chloride.

Example 2

5 parts of 2.4-dihydroxy-6.7-benzo-quinazoline are suspended in the 20-fold quantity of acetic acid and oxidized at 100° C. with a solution of 8 parts of chromic acid in acetic acid. On cooling the 1.3 - diaza - 2.4 - dihydroxy - anthraquinone formed is sucked off, rinsed with acetic acid and then with hot water. On drying the compound crystallizes from pyridine in splendid yellow needles; the free compound can also be recrystallized from about 100 parts of nitrobenzene. The dyestuff thus obtained is soluble in sulfuric acid with a yellow coloration, whereas the aqueous alkaline solution is orange.

By an analysis the following figures have been obtained:

|  | C | H | N |
|---|---|---|---|
|  | Per cent | Per cent | Per cent |
| Found | 59.5 | 2.3 | 11.4 |
| Calculated | 59.5 | 2.4 | 11.5 |

The 1.3-dihydroxy-6.7-benzo-quinazoline is obtainable by causing 2-naphthylamino-3-carboxylic acid to react with urea.

Example 3

To a suspension of 10 parts of 2-phenyl-4-hydroxy-6.7-benzo-quinazoline in 280 parts of 50 per cent sulfuric acid an excess of chromic acid is added while stirring at a temperature of 80° C., whereupon the 2-phenyl-4-hydroxy-6.7-benzo-quinazoline is dissolved while oxidizing. When the oxidation is finished the reaction product is stirred into water, the precipitated crude 2-phenyl-4-hydroxy-1.3-diaza-anthraquinone is filtered off and purified by way of the sodium salt which is difficultly soluble in diluted soda lye, eventually adding sodium hypo-chlorite. The compound thus obtained can be recrystallized from nitrobenzene; it yields an orange vat and is also soluble in sulfuric acid with an orange coloration.

Example 4

To a suspension of 2-(1'-nitro-2'-anthraquinonyl-)-4-hydroxy-6.7-benzo-quinazoline in 40 times the quantity of acetic acid there is gradually added while boiling excess chromic acid. When the reaction is almost complete a product of the following constitution precipitates:

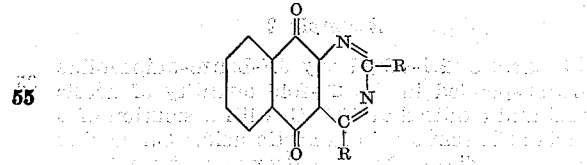

which is filtered with suction and rinsed. On crystallizing from nitrobenzene it forms weak yellowish needles; it yields a brown vat from which on shaking violet flakes separate.

The 2-(1'-nitro-2'-anthraquinonyl)-4-hydroxy-6.7-benzo-quinazoline serving as starting material has been obtained by causing 2-naphthalylamino-3-carbonamide to react with 1-nitro-anthraquinone-2-carboxylic acid chloride in a pyridine caustic potash lye with ring closure.

We claim:
1. The compounds of the general formula

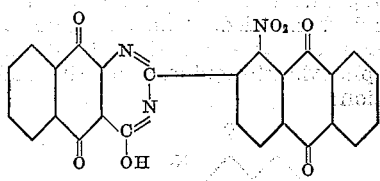

wherein one of the R's stands for the hydroxyl group and the other R stands for a radical selected from the group consisting of hydroxyl, phenyl and a vattable p-quinoidic radical containing at least 3 condensed rings.

2. The compounds of the following formula

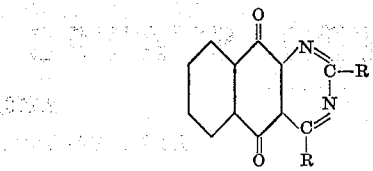

wherein one of the R's stands for the hydroxyl group and the other R stands for an anthraquinone.

3. The compound of the following formula

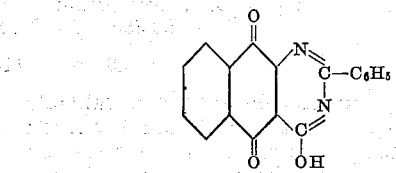

4. The compound of the following formula

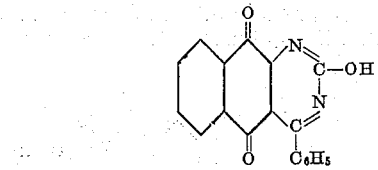

5. The compound of the following formula

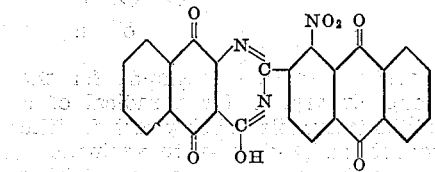

6. The process which comprises subjecting a 6.7-benzo-quinazoline to the action of such oxidizing agents as are capable of converting anthracene into anthraquinone.

7. The process which comprises subjecting a 6.7-benzo-quinazoline to the action of such oxidizing agents as are capable of converting anthracene into anthraquinone in the presence of an organic solvent.

8. The process which comprises subjecting a 6.7-benzo-quinazoline to the action of such oxidizing agents as are capable of converting anthracene into anthraquinone in the presence of sulfuric acid.

9. The process which comprises subjecting a 6.7-benzo-quinazoline to the action of an excess of chromic acid in the presence of sulfuric acid.

FRITZ BAUMANN.
HEINZ WERNER SCHWECHTEN.